(No Model.) 3 Sheets—Sheet 1.

C. A. PETTERSEN.
STOVE OR RANGE.

No. 579,280. Patented Mar. 23, 1897.

Witnesses.
C. F. Kilgore
F. D. Merchant

Inventor:
Carl A. Pettersen
By his Attorney.
Jas. F. Williamson (No Model.) 3 Sheets—Sheet 2.

C. A. PETTERSEN.
STOVE OR RANGE.

No. 579,280. Patented Mar. 23, 1897.

Witnesses.
C. F. Kilgore
A. D. Merchant

Inventor:
Carl A. Pettersen
By his Attorney
Jas. F. Williamson (No Model.) 3 Sheets—Sheet 3.

C. A. PETTERSEN.
STOVE OR RANGE.

No. 579,280. Patented Mar. 23, 1897.

Witnesses
C. F. Kilgore
G. D. Merchant

Inventor
Carl A. Pettersen
By his Attorney
Jas. F. Williamson

UNITED STATES PATENT OFFICE.

CARL A. PETTERSEN, OF MINNEAPOLIS, MINNESOTA, ASSIGNOR OF ONE-HALF TO CHRISTINA PETERSEN, OF SAME PLACE.

STOVE OR RANGE.

SPECIFICATION forming part of Letters Patent No. 579,280, dated March 23, 1897.

Application filed August 6, 1896. Serial No. 601,899. (No model.)

*To all whom it may concern:*

Be it known that I, CARL A. PETTERSEN, a citizen of the United States, residing at Minneapolis, in the county of Hennepin and State of Minnesota, have invented certain new and useful Improvements in Stoves or Ranges; and I do hereby declare the following to be a full, clear, and exact description of the invention, such as will enable others skilled in the art to which it appertains to make and use the same.

My invention relates to cooking-stoves and heaters, and has for its object to improve the same, with a view of increased efficiency and economy.

To these ends my invention consists of the novel devices and combinations of devices hereinafter described, and defined in the claims.

The invention is illustrated in the accompanying drawings, wherein, like notations referring to like parts throughout the several views—

Figure 1:
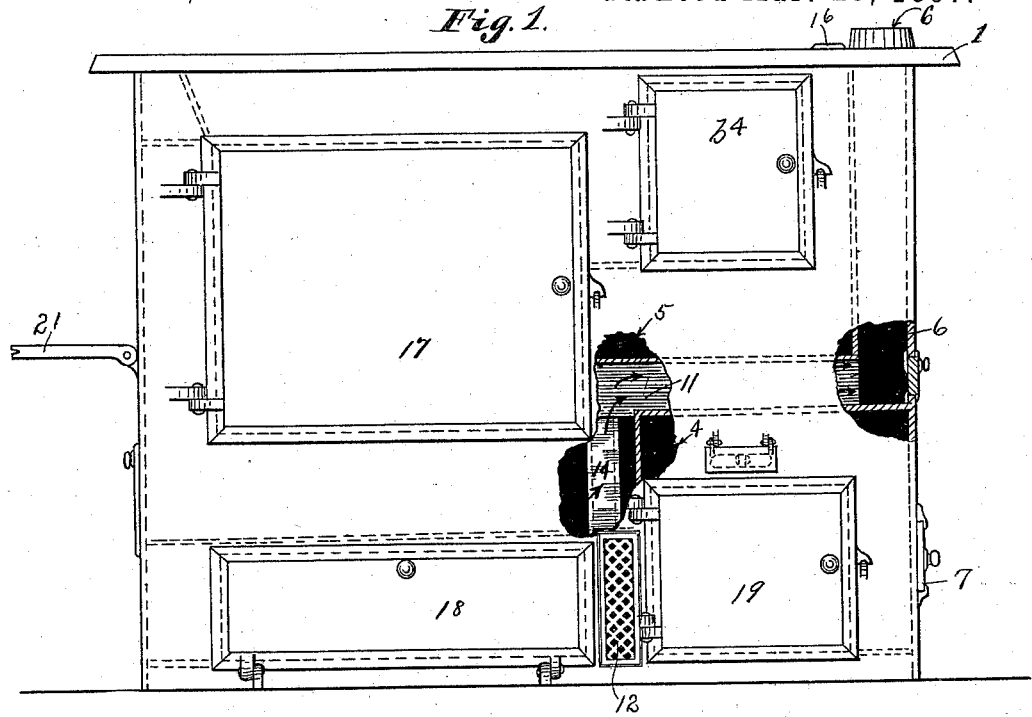
Figure 2:
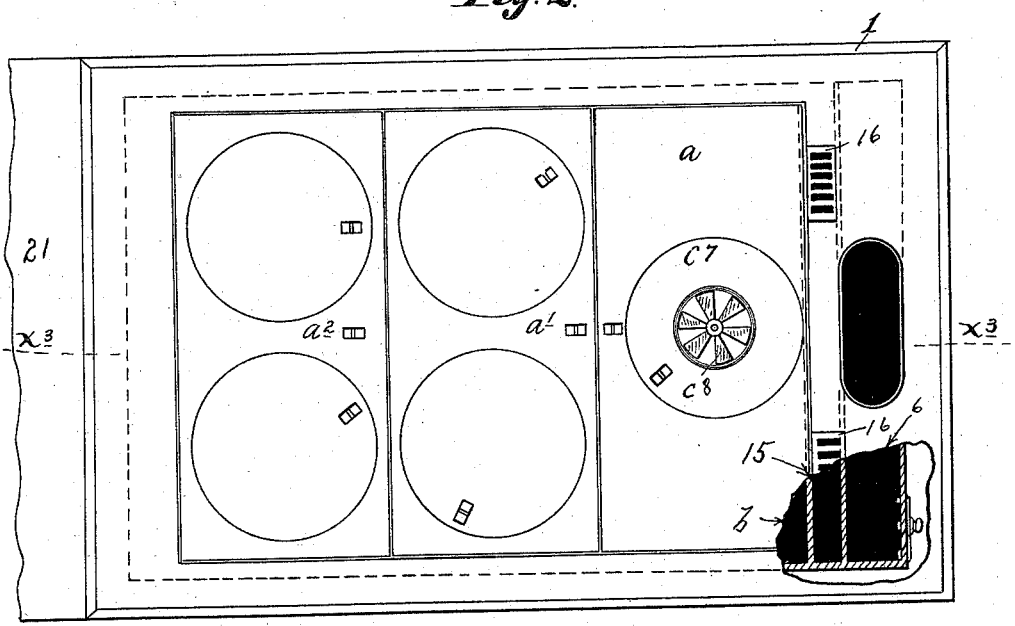
Figure 3:
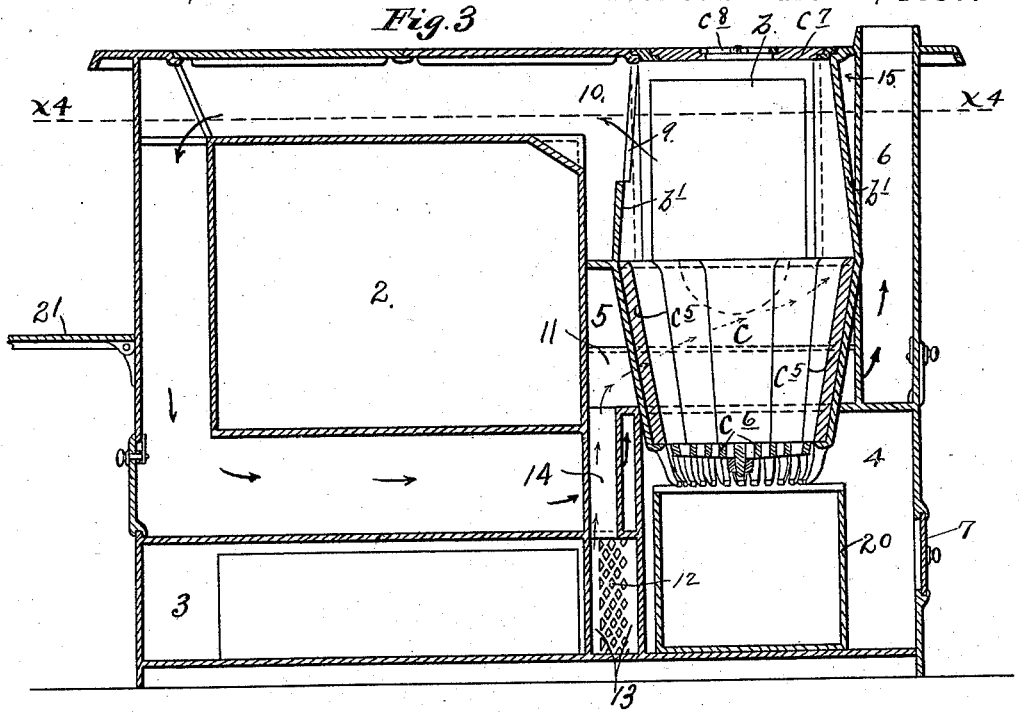
Figure 4:
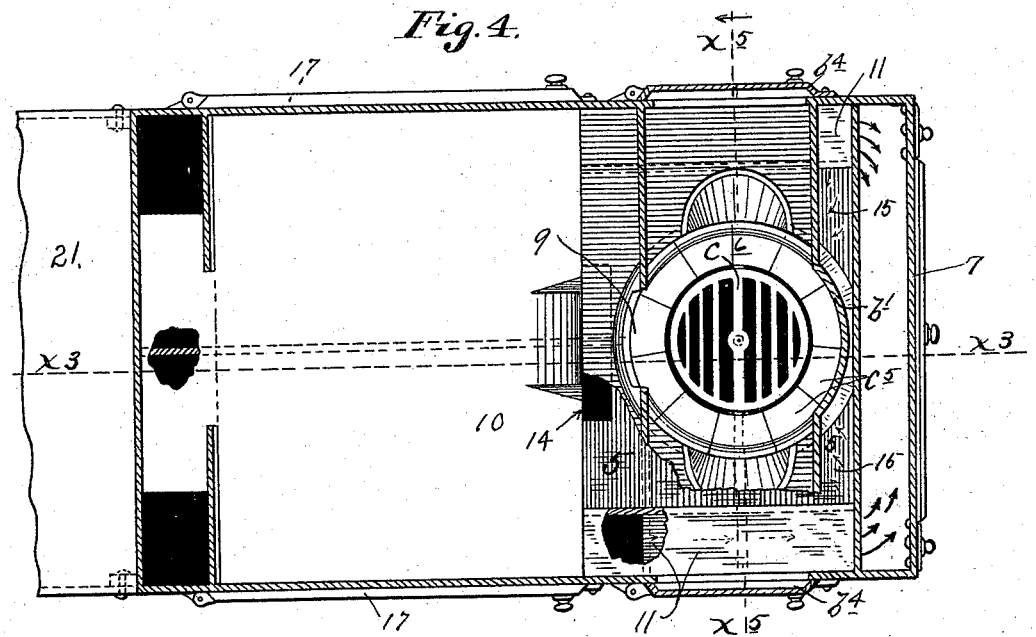
Figure 5:
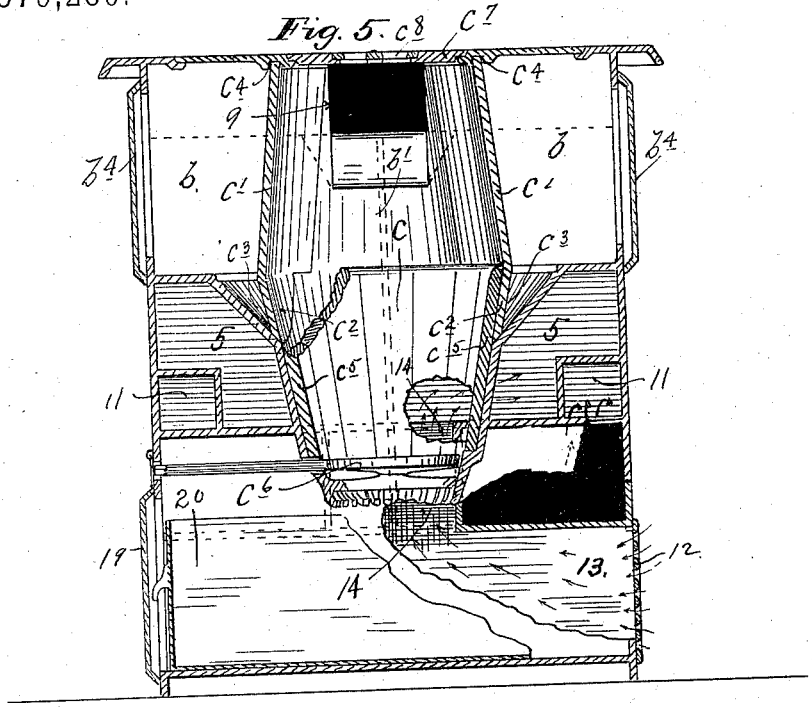
Figure 6:
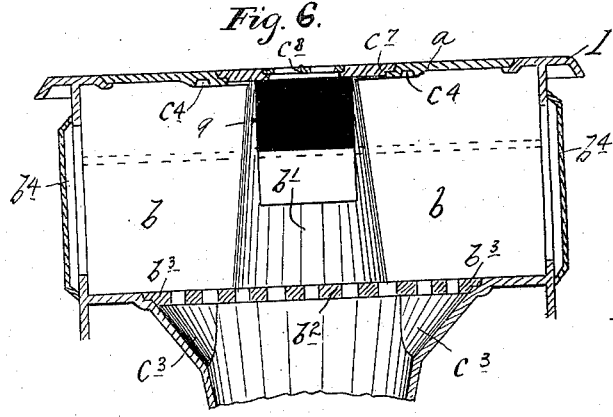
Figure 8:
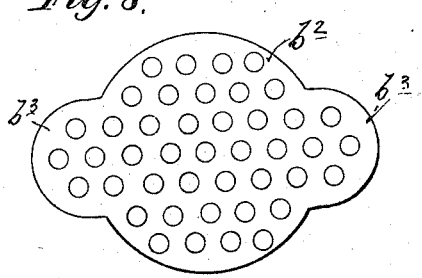
Figure 7:
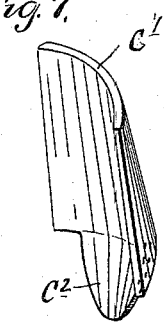

Figure 1 is a right-side elevation of a cooking stove or range equipped with my improvements, with some parts broken away and others shown in section. Fig. 2 is a plan view of the same, with some portions broken away and others shown in section. Fig. 3 is a longitudinal vertical section on the line $x^3 x^3$ of Figs. 2 and 4. Fig. 4 is a horizontal section on the line $x^4 x^4$ of Fig. 3. Fig. 5 is a vertical transverse section on the line $x^5 x^5$ of Fig. 4, with the substitute sections or filling-pieces for completing the coal-burner in working position. Fig. 6 is a view similar to Fig. 5, with the exception that the substitute sections for completing the coal-burner are removed and the bridge-plate for covering the coal-chamber of the fire-pot to complete the wood-burner is in working position. Fig. 7 shows one of the sections for completing the coal-burner detached, and Fig. 8 is a plan view of the bridge-plate for completing the wood-burner detached.

The main frame or body 1 of the stove or range is shown as of rectangular or box-like form and is provided with removable top-plate sections $a$ $a'$ $a^2$. The stove is provided with a baking-oven 2, a warming-oven 3, an ash-chamber 4, an air-heating chamber 5, an exit or stack flue 6, and a fire-pot of special construction for adaptation to the interchangeable use of wood or coal. The stationary or constant parts of the fire-pot are made up of what may be called the "wood-chamber" $b$ and the "coal-chamber" $c$, with the latter depending from the former at or near the center of the same and opening into the wood-chamber when uncovered. The side walls of the wood-chamber $b$ are formed with curvilinear sections $b'$ for coöperation with removable filling-sections $c'$ and the walls of the coal-chamber $c$ to complete the coal-burner when the said removable sections $c'$ are in the position shown in Fig. 5. The lower portion of each of the filling-pieces $c'$ is provided with a depending lug or tongue $c^2$, which engages with a corresponding seat $c^3$ in the coal-chamber casting $c$. The upper ends of the pieces $c'$ engage with annular grooves or seats $c^4$, provided for the same on the under surface of the top-plate section $a$ of the stove. In this way the filling-pieces $c'$ are locked to the stationary or permanent parts of the stove and securely held in working position when so desired.

$b^2$ is a perforated bridge-plate or grate-section which is adapted to close the upper end of the coal-chamber $c$ for completing the wood-burner when the sections $c'$ of the coal-burner have been removed. The seats $c^3$ in the coal-chamber casting $c$ are formed by laterally-extended parts of said casting, and the bridge-plate or grate $b^2$ is also provided with corresponding laterally-projecting parts $b^3$, so as to cover the seat $c^3$ when the said plate is in working position. The lining $c^5$ in the coal-chamber $c$ is removed at the same time with the filling-pieces $c'$, or before applying the bridge-plate or grate $b^2$ $b^3$. This affords a comparatively large grate-surface in the bottom of the wood-chamber when using the same as a wood-burner. The air which is supplied through the register or damper 7 to the ash-chamber 4 and the coal-grate $c^6$ can therefore pass freely through the coal-chamber $c$ and to the wood-grate $b^2$ $b^3$ when the parts are disposed, as above described, for burning wood.

The wood-chamber $b$ is provided with the customary door $b^4$, and the removable top section a is provided with a removable lid $c^7$ for the supply of coal when the parts are disposed for use as a coal-burner, as shown in Fig. 5. The lid $c^7$ is also equipped with a register 8, which serves to afford a top or check draft to the fire-pot whenever so desired.

The forward wall of the wood-chamber b is provided with an outlet 9 through one of the sections $b'$ to a combustion-chamber 10, which extends entirely around the baking-oven 2 to a junction with flues 11, extending through the air-heating chamber 5 to a junction with the exit or stack flue 6. In virtue of this construction the burning gases from the fire-pot are directed first against the upper rear wall of the baking-oven, thence pass over the top and down by the front walls of the oven, and thence under the baking-oven and over the top of the warming-oven to the flues 11, and thence through the said flues 11 to the exit or stack flue 6.

The air-heating chamber 5 is directly under the floor of the wood-chamber b and above the top of the ash-chamber 4, and the coal-chamber c depends downward from the floor of the wood-chamber through the said air-heating chamber. In virtue of this location of the air-heating chamber 5 in respect to the parts of the fire-pot above named and in virtue of the passage of the smoke-flues 11 therethrough the said air-heating chamber receives a considerable amount of heat directly from the fire-pot and an additional amount from the smoke-flues 11 and the exit-flue 6. The said air-heating chamber 5 is supplied with air from the room through registers 12, opening into a chamber or bottom flue 13, extending crosswise of the stove, between the warming-oven 3 and the ash-chamber 4, and connecting through a thimble or short flue 14 with the air-heating chamber 5. In this way the cold air is drawn into the stove at or near the floor-level. From the said chamber 5, at its back, extend upward hot-air or outlet flues 15, opening into the room through sliding dampers or registers 16 in the top plate of the stove. In virtue of this construction it is obvious that the air within the room can be forced over and over again through the stove and be heated as desired.

The oven 2 is shown as provided with the usual doors 17 and the oven 3 with the doors 18. The ash-chamber 4 is shown as provided with a door 19 and a removable ash-pan 20. A shelf 21 is shown as projecting from the forward vertical wall of the stove.

From the foregoing description it is thought that the construction and advantages of my improved stove will be understood. It is obvious that means are provided for burning either wood or coal and for the combined use of the stove as a cooker and a heater. It is also thought that the disposition of the fire-pot and the smoke-flues relative to the ovens and the air-heating chamber is such as to give a most efficient action.

The travel of the burning gases and the travel of the fresh air to be heated and the respective flues for conducting the said elements may be more readily traced on the drawings by noting that the heavy black arrows are intended to indicate the course of the products of combustion, while the light arrows are intended to indicate the course of the air.

It will be understood, of course, that changes might be made in the minor details of construction without departing from the spirit of my invention.

What I claim, and desire to secure by Letters Patent of the United States, is as follows:

1. A stove or range having a fire-pot provided with a coal-chamber opening at its upper end into an expanded wood-chamber, and provided with one or more removable wall-sections, securable within the wood-chamber, to complete and form an upper extension of said coal-chamber, substantially as described.

2. In a stove or range, the combination with the wood-chamber b having the curvilinear side-wall sections $b'$, of the coal-chamber c depending from the floor of said wood-chamber and having laterally-extended lug seat portions $c^3$, and the filling-pieces $c'$ with lugs $c^2$, for use, substantially as described.

In testimony whereof I affix my signature in presence of two witnesses.

CARL A. PETTERSEN.

Witnesses:
C. F. KILGORE,
F. D. MERCHANT.